United States Patent
Quigg

[11] 3,908,327
[45] Sept. 30, 1975

[54] INSULATED STRUCTURAL MEMBER
[75] Inventor: Paul S. Quigg, Barrington, Ill.
[73] Assignee: United States Gypsum Company, Chicago, Ill.
[22] Filed: Oct. 2, 1973
[21] Appl. No.: 402,880

[52] U.S. Cl. .................. 52/727; 52/359; 52/361; 52/479
[51] Int. Cl. .................................. E04c 3/30
[58] Field of Search ............ 52/347, 359, 360, 361, 52/480, 727, 728, 714, 479, 725

[56] References Cited
UNITED STATES PATENTS

| | | | |
|---|---|---|---|
| 775,562 | 11/1904 | Gollick | 52/602 |
| 1,210,560 | 1/1917 | Tappen | 52/647 |
| 1,579,715 | 4/1926 | Kridler et al. | 52/548 |
| 1,858,836 | 5/1932 | Martell | 52/647 |
| 2,100,624 | 11/1937 | Beckwith | 52/464 |
| 2,282,631 | 5/1942 | Winship | 85/11 |
| 2,370,052 | 2/1945 | Lindelow | 52/361 |
| 2,851,740 | 9/1958 | Baker | 52/479 |
| 3,217,456 | 11/1965 | Quigg et al. | 52/423 |
| 3,570,208 | 3/1971 | Nikai et al. | 52/746 |
| 3,748,815 | 7/1973 | Parker | 52/727 |

FOREIGN PATENTS OR APPLICATIONS

| | | | |
|---|---|---|---|
| 829,504 | 3/1960 | United Kingdom | 52/725 |

Primary Examiner—Alfred C. Perham
Attorney, Agent, or Firm—Samuel Kurlandsky, Esq.; Kenneth E. Roberts, Esq.; Stanton T. Hadley, Esq.

[57] ABSTRACT

An improved fire resistant structural member comprising the member and layers of insulation attached to the member by means which independently secure two overlapping layers of insulation.

13 Claims, 4 Drawing Figures

U.S. Patent  Sept. 30,1975  3,908,327
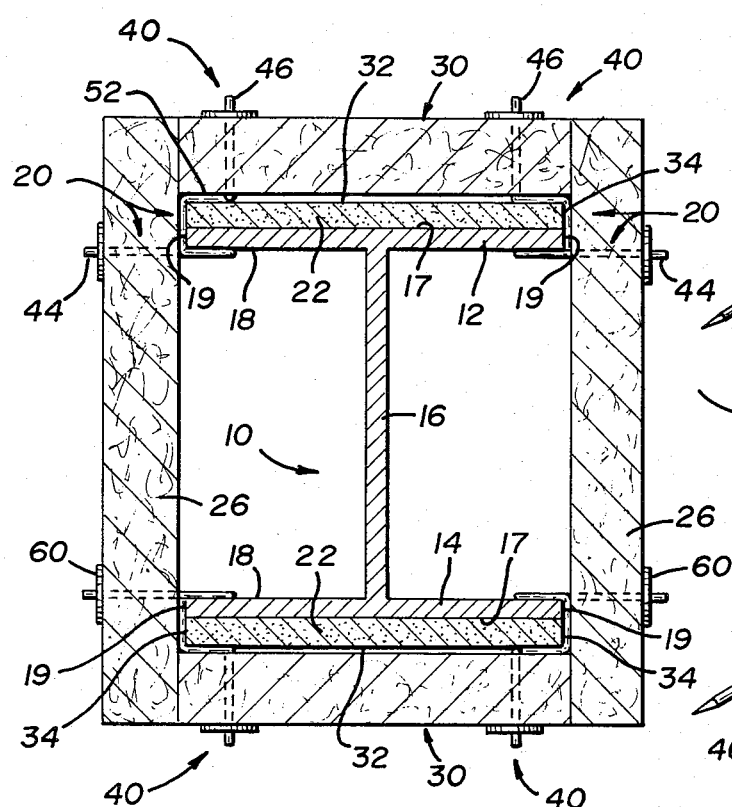
Fig. 1
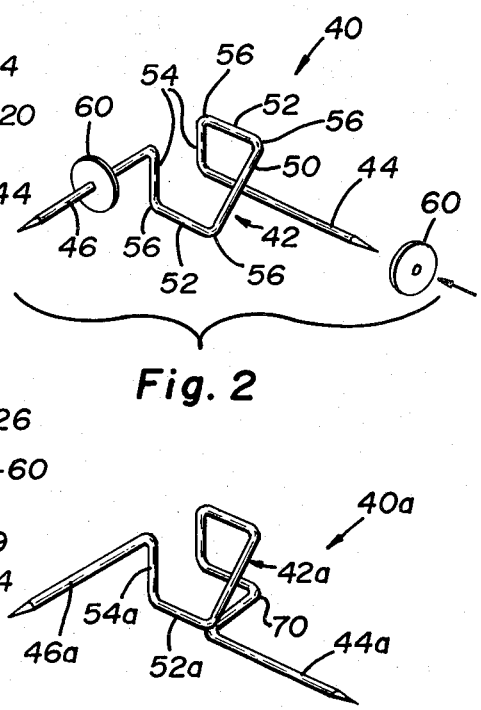
Fig. 2
Fig. 4
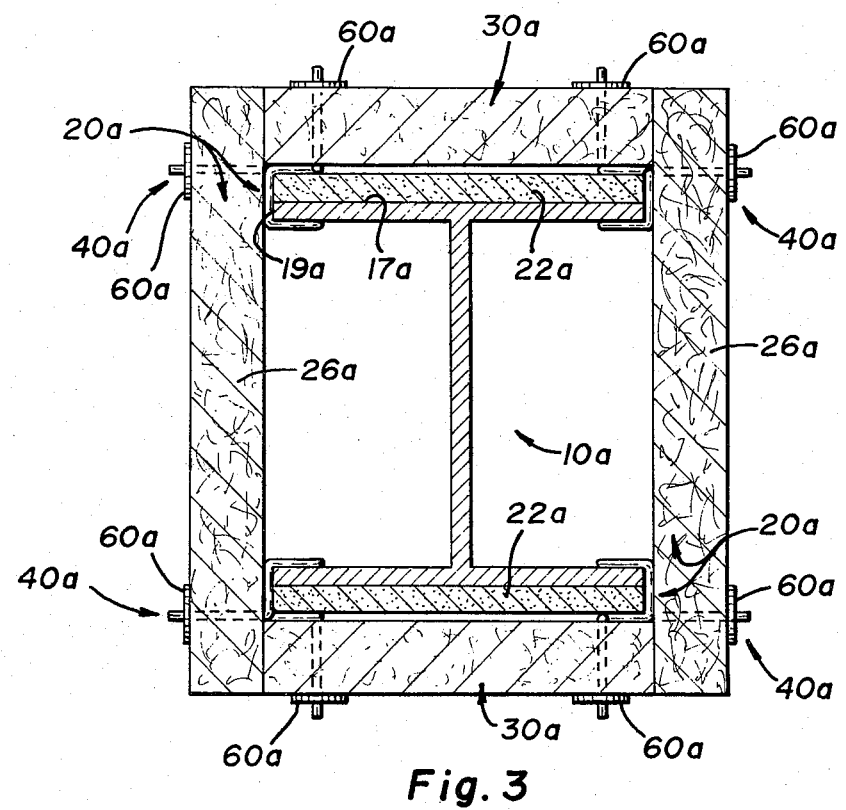
Fig. 3

INSULATED STRUCTURAL MEMBER

BACKGROUND OF THE INVENTION

Structural members such as steel columns, beams, girders, plates and the like are commonly sheathed, wrapped or otherwise enclosed by layers of insulation for protection. Conventionally, the insulation is relatively light in weight and is held in place by impaling clips or clamps attached to the member by one means or another. Examples of such clips are shown in U.S. Pat. Nos. 2,100,624, 2,370,052 and 3,570,208. The disadvantages of such clips has been their failure to provide independent means of protection which remain in effect even if the primary protective element fails. In most cases, the clips are secured, if at all, to the structural member only by time-consuming steps such as welding.

Additionally, structural members have also been protected against fire by wrapping them with layers of gypsum panels adhered together by joint cements. One example of such a construction is shown in U.S. Pat. No. 3,217,456. The structure disclosed therein, however, used tie members rather than clips.

A recent improvement in the insulation of structural members is disclosed in copending U.S. application Ser. No. 402,881, filed on Oct. 2, 1973 (Ideas 372 and 452), commonly owned with the instant application. The construction therein disclosed features a clip having a portion which grips the surfaces of a projecting edge of the structural member, so as to be self-attaching, and two insulation-impaling projections operatively connected to the gripping portion. Such a clip and assembly of insulation about a structural member has proven to be sufficient to give to the structural member fire-ratings of at least two hours as measured by ASTM E-119. It is possible, however, that the impaling projections which are the sole means for holding the insulation layers in place, could be accidentally weakened or broken off during or before a fire because of falling debris or other structural failure, or even due to careless assembly techniques. If that should happen the insulation layer would probably fall away from the structural member, leaving the latter unprotected during a fire. This would be true in spite of the fact that the clip would otherwise remain in place, due to its edge-gripping portion.

SUMMARY OF THE INVENTION

The invention relates to an improvement of the aforesaid application, which provides attachment means for independently securing an additional layer of insulation apart from the securing of the impaled insulation. Preferably, this layer is held against the structural member by the edge clamping portion of the clip rather than by the impaling projections thereof. More specifically, there is provided a fire-resistant structural assembly, comprising a structural member having opposed projecting edges and an exposed surface between said edges, a first layer of insulative material disposed over at least a portion of said exposed surface, a second layer of insulative material disposed over at least a portion of an exposed surface of said first layer, and attachment means for independently attaching said first and second layers of insulative material to said structural member. The structural member may thus be completely wrapped with insulation so as to have a first layer of insulative material disposed over the exposed surfaces so as to completely surround said member, and a second layer of insulative material disposed over at least a portion of said first layer, the securing of the layers being achieved by attachment means for independently attaching said first and second layers of insulative material to said member.

Accordingly, it is an object of the invention to provide an improved assembly of an insulated structural member, whereby an additional layer of insulation is disposed about the member in such a manner as to not be dependent upon the impaling projections of the clip for its attachment to the member.

It is a related object of the invention to provide such an assembly without requiring components, parts, or elements, other than the additional layer of insulation, in addition to that heretofore required.

Other objects and advantages will become apparent upon reference to the following drawings and discussion of the preferred embodiments.

BRIEF DESCRIPTION OF THE DRAWINGS

FIG. 1 is a transverse sectional view of a structural member insulated in accordance with the invention;

FIG. 2 is a perspective view of the clip shown in FIG. 1, and of its securing members;

FIG. 3 is a sectional view similar to FIG. 1, but illustrating an alternate embodiment of the invention; and FIG. 4 is a perspective view of the clip shown in FIG. 3.

DESCRIPTION OF THE PREFERRED EMBODIMENTS

The invention concerns the insulation, and particularly the fire protection, of structural members such as beams, columns, girders, and others having exposed surfaces terminating in a plurality of projecting edges. A column is illustrated only by way of example.

Referring now to FIG. 1, a column 10 having the form of an I-beam defined by side flanges 12 and 14 connected by a web 16, is wrapped with a first layer of insulation 20 and a second layer of insulation 30. These layers are secured or attached to the member by a clip 40. More specifically, the side flanges have exposed surfaces 17 and inwardly directed surfaces 18, these surfaces terminating in projecting edges 19. It is the exposed surfaces 17 which must be protected and insulated from the heat of a fire, in order to permit the structural member to be fire-rated. Thus, layer 20 is formed by a sheet of insulative material 22 disposed over a portion, and preferably all of, surfaces 17, and two sheets of insulation 26 disposed over paired edges 19 so as to bridge the space between the flanges 12 and 14 on both sides of the member, thus surrounding the member.

To provide additional protection to surface 17 of the member 10, the second layer of insulation 30 is independently disposed over the exterior, temporarily exposed surface 32 of sheet 22 which faces away from the surface of the structural member, thus overlapping sheet 22. As shown, layer 30 bridges the space between the sheets 26 forming layer 20, so that the sheets 26 intersect the plane of the sheets 22 and 32 along the edges 34 of sheets 22 and 32.

The aforedescribed layers of insulation are attached to the member 10 by the clip 40. Referring now particularly to FIG. 2, as described in the aforesaid copending application, the clip is preferably a unitary bent wire, comprising a clamping portion or member 42 and two elongate impaling projections or prongs 44 and 46 separated from the clamping portion. Portion 42 includes a pocket bent so as to define a C-shaped member or bight having a back 50 and two legs 52 joined by generally parallel extensions 54. Portion 42 thus includes four generally right-angle bends 56. Projections 44 and 46 are respectively angled so as to project generally perpendicular from the surface to be protected by the layer of insulation impaled thereover. A cap member 60 may be inserted over the prongs 44 and 46 after the layers 26 and 30 are impaled.

Clamping portion 42 and the impaling projections comprise attachment means which independently attach the various layers of insulation. That is, when assembled, the clamping portion 42 is inserted about the edge 19 as well as the edges 34 and surface 32 of the sheet 22, insuring that sheet 22 will be held in place. Thus, one of the legs 52 of clamping portion 42 extends generally parallel to surface 17, so as to sandwich sheet 22 between the leg and surface 17. Insulative layer 30 is then impaled over projection or prong 46, while sheets 26 are impaled over prongs 44. Prongs 46 thus extend generally perpendicular to both surfaces 32 and 17.

In this manner, the assembly of the clip and the layers of insulation insures that the major exposed surface 17 of the member 10 will be protected even if prongs 46 should fail. That is, insulative sheet 22 is independently attached by portion 42 to the member, apart from the impaling of layer 30.

The sheets of insulative material can comprise any material. Preferably, they are fire resistant. By way of example, sheets 26 and 30 are a mineral wool felt comprising any bunched amorphous elongated filaments having been made predominantly from iron, copper, or lead blast furnace slag, and having a composition comprising silicon dioxide and metallic oxides, the percentage by weight of the metallic oxides being greater in total than the percentage of silicon dioxide. Conveniently, such wool is applied to the member 10 in preformed semirigid sheets, which sheets are conventionally made through the use of a phenolic binder. For economic reasons, the density of the sheets is preferably less than about 10 pcf. It has been found that these felt sheets will retain their fire protective integrity when attached to a structural member subjected to the heat of a fire, thereby insulating the member against the heat of the fire. Sheet 20 may be a conventional rehydrated gypsum board, with or without a paper cover sheet. Such board has well-recognized fire-resistant properties.

FIGS. 3 and 4 illustrate an alternate embodiment using a modified clip. Parts similar to those previously described bear the same reference numeral, to which the distinguishing suffix *a* has been added. Thus, member 10*a* has surfaces 17*a* and edges 19*a* protected by layers of insulative material 20*a* and 30*a* disposed about the member and material 20*a*, respectively. As in the other embodiment, the layers are attached to the member by a unitary clip 40*a*, which comprises (FIG. 4) a clamping member or portion 42*a* and impaling projections 44*a* and 46*a*. Cap members 60*a* (FIG. 3) may be used as before. However, in this embodiment projection 44*a* is not completely linear, but is bent approximately 90° at point 70 so as to terminate along a line which falls in the general plane of the leg 52*a* and extension 54*a* joined to prong 46*a* (FIG. 3). The result is that sheet 26*a* of layer 20*a* is secured at a point which generally coincides with the interface between layer 30*a* and sheet 22*a*.

Although the invention has been described in connection with certain preferred embodiments, it is not intended that it be limited thereto. Rather, it is intended that it cover all alternative arrangements, equivalents, and embodiments as may be included within the scope of the following claims.

What is claimed is:

1. A fire-resistant structural assembly, comprising a structural member having projecting edges and an exposed surface between said edges, a first layer of insulative material disposed over at least a portion of said exposed surface, a second layer of insulative material disposed over at least a portion of an exposed surface of said first layer, and attachment means for independently attaching said first and second layers of insulative material to said structural member comprising an integral clip including a clamping portion and an impaling portion, said first layer being clamped to said structural member by said clamping portion, and said second layer being attached to said structural member by said impaling portion.

2. A fire-resistant structural assembly according to claim 1, wherein said clamping portion simultaneously grips overlying portions of both a projecting edge of said structural member and said first layer of insulative material.

3. A fire-resistant structural assembly according to claim 1, including a third sheet of insulative material disposed in a plane intersecting the plane of said second layer of insulative material along an edge thereof, and wherein said attachment means independently attach said third layer of insulative material to said structural member.

4. A fire-resistant structural assembly according to claim 3, wherein said attachment means include a clamping portion and at least two impaling portions, said first layer is attached to said structural member by said clamping portion, and said second and third layers are attached to said structural member by a respective one of said two impaling portions.

5. A fire-resistant structural assembly, comprising
 a structural member having projecting edges and an exposed surface between said edges,
 a first layer of insulative material disposed over at least a portion of said exposed surface, said first layer having an exterior surface directed away from said exposed surface,
 a second layer of insulative material disposed over at least a portion of said exterior surface of said first layer, and
 attachment means for attaching said first and second layers of insulative material to said structural member,
 said means including an impaling projection for impaling one of said layers and a clamping member separate from said projection, disposed over a portion of an exterior surface of the other of said layers so as to hold said other layer in position.

6. A fire-resistant structural assembly, comprising
 a structural member having projecting edges,
 a first layer of insulative material disposed over at least a portion of the exposed surface of said structural member between said projecting edges, said layer having two opposed exterior surfaces one of which faces said exposed structural member surface, a second layer of insulative material disposed over at least a portion of the other of said opposed surfaces of said first layer, and attachment means for attaching said first and second layers of insulative material to said structural member, said means including an impaling projection for impaling one of said layers and a clamping member separate from said projection, disposed over a portion of an exterior surface of the other of said layers so as to hold said other layer in position.

7. The assembly as defined in claim 6, wherein said other layer is said first layer and said one layer is said second layer.

8. The assembly as defined in claim 7, wherein said impaling projection extends generally perpendicular to said other opposed exterior surface, said second layer being impaled on said projection.

9. The assembly as defined in claim 6, and further including another impaling projection and a third sheet of insulative material impaled over said other projection, said third sheet being angularly disposed about said structural member with respect to said first and second layers.

10. The assembly as defined in claim 9, wherein said other projection lies generally in the plane of the interface between said first and said second layers.

11. The assembly as defined in claim 6, wherein a portion of said clamping member extends generally parallel to said exposed structural member surface, said first layer being sandwiched between said clamping member and said exposed structural member surface.

12. The assembly as defined in claim 6, wherein said impaling projection extends generally perpendicular to said other opposed exterior surface, said second layer being impaled on said projection.

13. A fire-resistant structural assembly, comprising a structural member having exposed surfaces terminating in a plurality of edges, a first layer of insulative material disposed over the exposed surfaces so as to completely surround said member, a second layer of insulative material disposed over at least a portion of said first layer, and attachment means for independently attaching said first and second layers of insulative material to said member, said attachment means including a plurality of clips spaced apart along said edges, each of said clips including an impaling projection for impaling one of said layers and a clamping member separate from said projection, disposed over a portion of an exterior surface of the other of said layers and one of said edges so as to hold said other layer in position, clamped to said structural member.

* * * * *